United States Patent
Dinakar et al.

(10) Patent No.: US 11,724,696 B2
(45) Date of Patent: Aug. 15, 2023

(54) SYSTEM AND METHOD OF AUTOMATEDLY CHANGING LANES FOR A VEHICLE

(71) Applicant: GM Global Technology Operations LLC, Detroit, MI (US)

(72) Inventors: Jeffrey Pradeep Dinakar, Novi, MI (US); Alyssa Lauren Scheske, Ann Arbor, MI (US); Andrew Wassef, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 213 days.

(21) Appl. No.: 17/469,442

(22) Filed: Sep. 8, 2021

(65) Prior Publication Data

US 2023/0070251 A1    Mar. 9, 2023

(51) Int. Cl.
*B60W 30/18* (2012.01)
*G05D 1/02* (2020.01)
*G05D 1/00* (2006.01)

(52) U.S. Cl.
CPC ..... *B60W 30/18163* (2013.01); *G05D 1/0088* (2013.01); *G05D 1/0274* (2013.01); *B60W 2552/10* (2020.02); *B60W 2552/53* (2020.02); *B60W 2554/20* (2020.02); *B60W 2556/60* (2020.02); *G05D 2201/0213* (2013.01)

(58) Field of Classification Search
CPC ....... B60W 30/18163; B60W 2554/20; B60W 2552/53; B60W 2556/60; B60W 2552/10; G05D 1/0088; G05D 1/0274; G05D 2201/0213
See application file for complete search history.

(56) References Cited

U.S. PATENT DOCUMENTS

| | | | |
|---|---|---|---|
| 7,363,140 B2 * | 4/2008 | Ewerhart | B60W 30/143 701/96 |
| 9,672,738 B1 * | 6/2017 | Ferguson | G08G 1/096844 |
| 10,013,882 B2 * | 7/2018 | Fujii | G08G 1/167 |
| 2017/0120804 A1 * | 5/2017 | Kentley | B60Q 1/507 |
| 2018/0290657 A1 * | 10/2018 | Ryne | B60W 10/20 |
| 2018/0349711 A1 * | 12/2018 | Prasad | G01S 15/08 |
| 2019/0143971 A1 * | 5/2019 | Makled | G08G 1/096725 701/96 |

\* cited by examiner

*Primary Examiner* — Ramsey Refai
(74) *Attorney, Agent, or Firm* — Vivacqua Crane PLLC

(57) ABSTRACT

A system for automatedly changing a first road lane of a vehicle to a second road lane to maintain engagement of an automated driving unit. The system comprises an ECU to check a location of the vehicle, defining a map segment of the first and second road lanes. The first road lane is a host lane that the vehicle occupies and the second road lane is an available lane. The ECU detects whether the first road lane has poor availability. The system further comprises a sensor to monitor availability of the first road lane. The system further comprises a backoffice to flag the first road lane if the first road lane is detected to have poor availability, to log the first road lane in an instance counter (IC), and to designate the first road lane as non-preferred if an occurrence threshold of the IC is reached. The system further comprises an automated lane change (ALC) unit to move the vehicle to the second road lane.

20 Claims, 2 Drawing Sheets

SYSTEM AND METHOD OF AUTOMATEDLY CHANGING LANES FOR A VEHICLE

INTRODUCTION

The present disclosure relates to systems and methods of automated lane changing and, more particularly, systems and methods of automated lane changing while maintaining engagement of an automated driving system in a vehicle.

During operation of a semi-autonomous or an autonomous vehicle, automated driving systems experience escalations that may result in user pain points. In certain situations, vehicle lane changing requires disengagement of the automated driving system of a vehicle which may be undesirable.

SUMMARY

Thus, while current vehicles with automated driving systems (ADS) are adequate to change lanes, there is a need for a new and improved system and method for maintaining engagement of an ADS of a vehicle during lane changes.

Accordingly, a system and methods of automatedly changing a first road lane in which a vehicle occupies to a second road lane based on environmental conditions to maintain engagement of an automated driving system with a global positioning system (GPS) of the vehicle are provided as aspects of the present disclosure. In accordance with one aspect of the present disclosure, a method of automatedly changing a first road lane in which a vehicle occupies to a second road lane based on environmental conditions to maintain engagement of an automated driving system with a GPS of the vehicle is provided. The method comprises providing a road map database.

The method further comprises checking a location of the vehicle based on the GPS of the vehicle and the road map database to define a map segment of the first and second road lanes. The first road lane is designated a host lane in which the vehicle occupies in the map segment. The second road lane is designated as an available lane in the map segment based on environmental conditions.

In this aspect, the method further comprises monitoring availability of the first road lane of map segment. The method further comprises detecting whether the first road lane of the map segment has poor availability based on environmental conditions and flagging the first road lane of the map segment if the first road lane is detected to have poor availability. The method further comprises logging the first road lane of the map segment in an instance counter calibrated to a predetermined occurrence threshold.

Further in this aspect, the method comprises designating the first road lane as non-preferred if the predetermined occurrence threshold is reached and moving the vehicle to the second road lane with the automated driving system. Furthermore, the method comprises designating the second road lane as the host lane.

In one example of this aspect, the method further comprises maintaining the vehicle in the first road lane of the map segment if the first road lane is detected to have acceptable availability. Moreover, the method further comprises maintaining the first road lane as the host lane if the vehicle is maintained in the first road lane. Furthermore, in this example, the method comprises maintaining engagement of the automated driving system with the vehicle if the first road lane is maintained as the host lane.

In another example of this aspect, the environmental conditions include road conditions, lane lines, obstructions, and road maintenance. In yet another aspect, acceptable availability is based on environmental conditions that allow the automated driving system to maintain engagement with the vehicle during operation. In still another example, poor availability is based on environmental conditions that would impede on the engagement of the automated driving system with the vehicle during operation.

In one example of this aspect, the step of checking the location of the vehicle comprises comparing a first data of the vehicle from the GPS with a second data of the map segment from the road map database. The step of checking further comprises determining the location of the vehicle relative to the map segment.

In another embodiment, the first data of the vehicle from GPS provides transmitted information to calculate a three-dimensional location of the vehicle relative to time and the second data of the map segment from the road map database provides environmental information relative to lane lines and condition of the first and second road lanes.

In accordance with another aspect of the present disclosure, a system for automatedly changing a first road lane in which a vehicle occupies to a second road lane based on environmental conditions to maintain engagement of an automated driving system with a global positioning system (GPS) of the vehicle is provided. The system comprises an electronic control unit (ECU) dispose in the vehicle and in communication with the automated driving system. The ECU is arranged to check a location of the vehicle based on a GPS data of the vehicle and a road map database, defining a map segment of the first and second road lanes. In this embodiment, the first road lane is designated a host lane in which the vehicle occupies in the map segment. The second road lane is designated as an available lane in the map segment based on environmental conditions. Moreover, the ECU is arranged to receive an availability signal representing availability of the first road lane of the map segment and to detect whether the first road lane of the map segment has poor availability based on environmental conditions.

In this aspect, the system further comprises at least one sensor disposed about the vehicle and arranged to monitor availability of the first road lane of map segment. The at least one sensor is in communication with the ECU to send the availability signal representing availability of the first road lane of the map segment.

Moreover, the system further comprises a back office unit disposed remotely from the vehicle and in communication with the ECU. The back office unit is arranged to flag the first road lane of the map segment if the first road lane is detected to have poor availability. In this aspect, the back office unit is arranged to log the first road lane of the map segment in an instance counter of the back office unit. The instance counter is calibrated to a predetermined occurrence threshold. Furthermore, the back office unit is arranged to designate the first road lane as non-preferred if the predetermined occurrence threshold is reached.

In this aspect of the present disclosure, the system further comprises an automated lane change (ALC) unit disposed in the vehicle and in communication with the ECU. The ALC unit is arranged to move the vehicle to the second road lane with the automated driving system.

In one embodiment of this aspect, the system further comprises a road map module disposed in the vehicle and in communication with the ECU. The road map module is arranged to store the road map database. The road map database is a compilation of road maps within predetermined regions. In this embodiment, the system further comprises a receiver disposed in the vehicle and in communication with the ECU. The receiver is arranged to receive locational data of the vehicle from the GPS.

In another embodiment, the ECU is arranged to check a location of the vehicle by comparing a first data of the vehicle from the GPS with a second data of the map segment from the road map database and by determining the location of the vehicle relative to the map segment.

In yet another embodiment of this aspect, the locational data of the vehicle from GPS provides transmitted information to calculate a three-dimensional location of the vehicle relative to time and wherein the second data of the map segment from the road map database provides environmental information relative to lane lines and condition of the first and second road lanes.

In still another embodiment, the ECU is arranged to designate the second road lane as the host lane after the vehicle is moved to the second road lane.

In another embodiment of this aspect, the ECU is arranged to maintain the vehicle in the first road lane of the map segment if the first road lane is detected to have acceptable availability. Moreover, the ECU is arranged to maintain the first road lane as the host lane if the vehicle is maintained in the first road lane. Furthermore, the ECU is arranged to maintain engagement of the automated driving system with the vehicle if the first road lane is maintained as the host lane.

In yet another embodiment, environmental conditions include road conditions, lane lines, obstructions, and road maintenance. In still another embodiment, acceptable availability is based on environmental conditions that allow the automated driving system to maintain engagement with the vehicle during operation. In another embodiment, poor availability is based on environmental conditions that would impede on the engagement of the automated driving system with the vehicle during operation.

In accordance with another aspect of the present disclosure, another method of automatedly changing a first road lane in which a vehicle occupies to a second road lane based on environmental conditions to maintain engagement of an automated driving system with a global positioning system (GPS) of the vehicle is provided. The method comprises providing a road map database.

In this aspect, the method further comprises checking a location of the vehicle based on the GPS of the vehicle and the road map database to define a map segment of the first and second road lanes. The first road lane is designated a host lane in which the vehicle occupies in the map segment. Moreover, the second road lane is designated as an available lane in the map segment based on environmental conditions.

In this example, the method further comprises monitoring availability of the first road lane of map segment and detecting whether the first road lane of the map segment has poor availability based on environmental conditions. The method further comprises flagging the first road lane of the map segment if the first road lane is detected to have poor availability and logging the first road lane of the map segment in an instance counter calibrated to a predetermined occurrence threshold.

Still in this example, the method further comprises designating the first road lane as non-preferred if the predetermined occurrence threshold is reached and moving the vehicle to the second road lane with the automated driving system. Moreover, the method comprises designating the second road lane as the host lane.

Further in this example, the method comprises maintaining the vehicle in the first road lane of the map segment, if the first road lane is detected to have acceptable availability. Moreover, the method comprises maintaining the first road lane as the host lane if the vehicle is maintained in the first road lane. Furthermore, the method comprises maintaining engagement of the automated driving system with the vehicle if the first road lane is maintained as the host lane.

In one example of this aspect, environmental conditions include road conditions, lane lines, obstructions, and road maintenance. In another example, acceptable availability is based on environmental conditions that allow the automated driving system to maintain engagement with the vehicle during operation. In yet another example, poor availability is based on environmental conditions that would impede on the engagement of the automated driving system with the vehicle during operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure provides systems and methods of optimizing engagement of an automated driving system (ADS) during operation of a vehicle, thereby reducing escalations of the ADS that a user may otherwise experience. The systems and methods of the present disclosure allow the vehicle to automatedly change lanes by way of an automated lane change (ALC) unit without disengaging the ADS during operation. As a result, overall escalations of the ADS are reduced.

Figure 1:
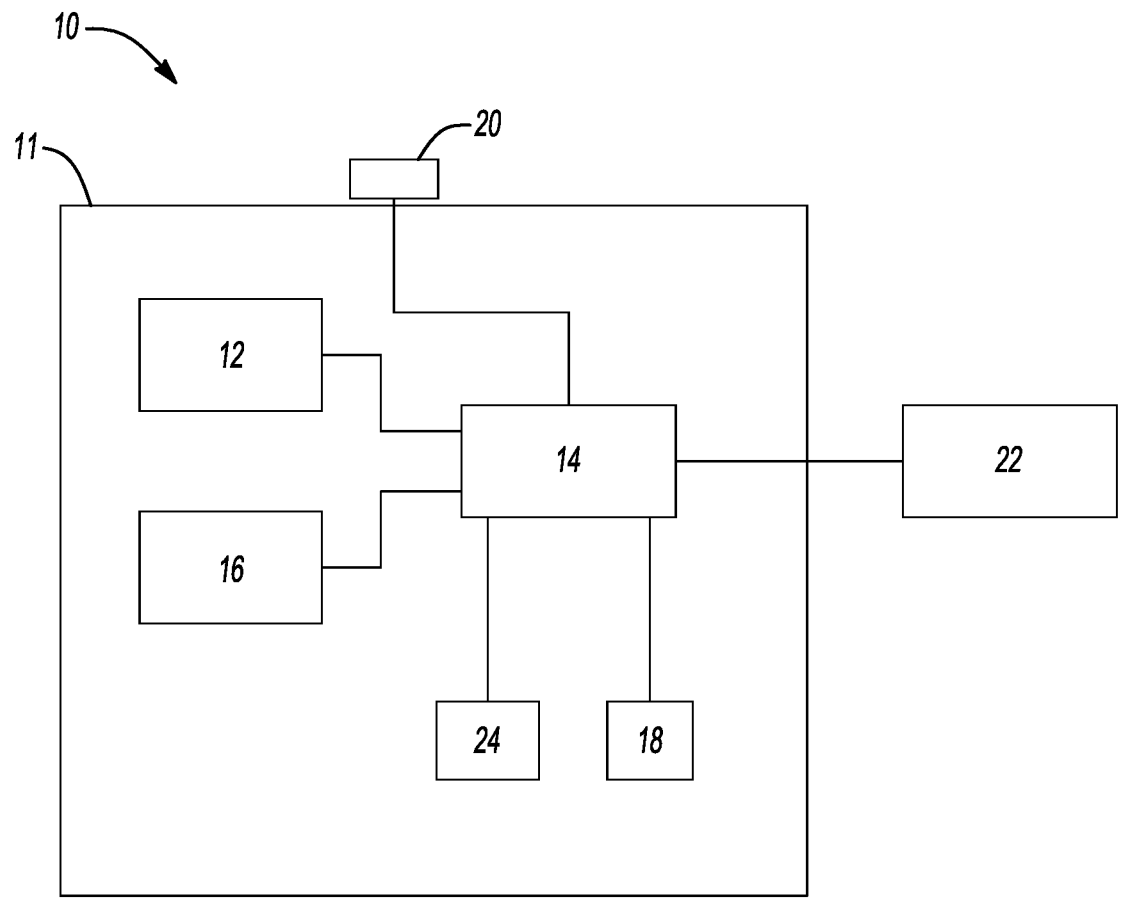
FIG. 1 is a flowchart of a method of automatedly changing a lane of a vehicle in accordance with one example of the present disclosure.

In accordance with one embodiment of the present disclosure, FIG. 1 depicts a system 10 for automatedly changing a first road lane in which a vehicle 11 occupies to a second road lane based on environmental conditions to maintain engagement of an automated driving system (ADS) 12 with a global positioning system (GPS) of the vehicle. As shown, the system 10 comprises an electronic control unit (ECU) 14 dispose in the vehicle and in communication with the ADS of the vehicle. The ECU 14 is arranged to check a location of the vehicle based on a global positioning system (GPS) data (or locational data) of the vehicle and a road map database, defining a map segment of the first and second road lanes. In one example, the ECU 14 may check the location of the vehicle by comparing a first or locational data of the vehicle from the GPS with a second or map data of the map segment from the road map database. In this example, the ECU 14 is able to determine the location of the vehicle relative to the map segment.

In this embodiment, the first road lane is designated a host lane in which the vehicle occupies in the map segment. The second road lane is designated as an available lane in the map segment based on environmental conditions. That is, availability of a lane is based on environmental condition such as road conditions, lane lines, obstructions, and road maintenance. Moreover, the ECU 14 is arranged to receive an availability signal (discussed in greater detail below) representing availability of the first road lane of the map segment. Further, the ECU 14 is arranged to detect whether the first road lane of the map segment has poor availability or acceptable availability based on environmental conditions.

It is to be understood that environmental conditions may include road conditions, lane lines, obstructions, road maintenance and any other external conditions that could impede on the engagement of the ADS with the vehicle during operation. Moreover, inclusion of any other external conditions would not depart from the scope or spirit of the present disclosure.

In this example, acceptable availability is based on environmental conditions of the host lane that allow the ADS to maintain engagement with the vehicle during operation. In one example, the ECU 14 may include an algorithm having logic, steps, calculations, and limits to determine acceptable availability. Moreover, poor availability may be based on environmental conditions that would impede on the engagement of the automated driving system 12 with the vehicle during operation. In one example, the ECU 14 may include an algorithm having logic, steps, calculations, and limits to determine poor availability.

As depicted in FIG. 1, the system 10 further comprises a receiver 16 disposed in the vehicle and in communication with the ECU 14. The receiver 16 is arranged to receive the locational data of the vehicle from the GPS. In this embodiment, locational data of the vehicle is transmitted from the GPS and received by the receiver 16. From the receiver 16, the locational data is sent to the ECU 14 to determine or calculate a three-dimensional location of the vehicle relative to time.

Referring to FIG. 1, the system 10 further comprises a road map module 18 disposed in the vehicle and in communication with the ECU 14. The road map module 18 is arranged to store the road map database. In this embodiment, the road map database is a compilation of road maps within predetermined regions such as regions within a city, a county, a state, a country or globally. Moreover, the map data of the map segment from the road map database provides environmental information relative to environmental conditions of the first and second road lanes.

As depicted in FIG. 1, the system 10 further comprises at least one sensor 20, preferably a plurality of sensors, disposed about the vehicle and in communication with the ECU 14. In this embodiment, the sensor 20 is arranged to monitor availability of the first road lane of map segment. For example, the sensor 20 may be a camera (or a plurality of cameras) disposed at the front exterior to the vehicle. It is to be understood that the sensor 20 may be any other suitable device disposed at any suitable location on the vehicle without departing from the spirit or scope of the present disclosure. Further, the sensor 20 is in communication with the ECU 14 and is arranged to send the availability signal representing availability of the first road lane of the map segment.

Referring to FIG. 1, the system 10 further comprises a back office unit 22 disposed remotely from the vehicle and in wireless communication with the ECU 14 by any known means such as internet connection. If the first road lane is detected to have poor availability, the ECU 14 sends a first signal to the back office unit 22 accordingly. That is, the first signal is a first data representing that the first road lane has poor availability. The back office unit 22 is arranged, or may have a controller that is arranged, to flag the first road lane of the map segment when the back office unit 22 receives the first signal from the ECU 14. That is, the first data is added to a backoffice database (not shown) of the back office unit 22 if the first signal is sent.

When the first road lane is flagged, the back office unit 22 is arranged to log the first road lane of the map segment in an instance counter of the back office unit 22. In this embodiment, the instance counter is calibrated to a predetermined occurrence threshold, e.g., 3 times, 5 times, 10 time or any other suitable threshold. If the predetermined occurrence threshold of the instance counter is reached, then the back office unit 22 is arranged to designate the first road lane as non-preferred. Such information is stored within the backoffice database and is communicated to the ECU 14 to be stored in the road map module 18.

In this aspect of the present disclosure, the system 10 further comprises an automated lane change (ALC) unit 24 disposed in the vehicle and in communication with the ECU 14. If the back office unit 22 designates the first road lane as non-preferred, the ALC unit 24 is arranged to move the vehicle to the second road lane with the automated driving system (ADS) 12. After the vehicle is moved to the second road, the ECU 14 is arranged to designate the second road lane as the host lane.

It is to be understood that the ALC unit 24 may be a separate component from the ECU 14 to move the vehicle to the second road lane with the ADS 12. It is also to be understood that the ALC unit 24 may be an algorithm stored within and run by the ECU 14 to move the vehicle to the second road lane with the ADS 12 without departing from the spirit or scope of the present disclosure.

It is to be understood that each of the sensors 20, the receiver 16, the road map module 18, the automated lane change unit 24, and the automated driving system 12 may be in communication with the ECU 14 by wireless means, by way of wire, or by any other suitable manner without departing from the spirit or scope of the present disclosure.

It is understood that the ECU 14, the ALC unit 24, the ADS, the back office unit 22 and other units involved with the system of the present disclosure include algorithms to, for example, automatedly drive the vehicle during operation, maintain engagement of the ADS with the vehicle, log the first road lane of the map segment in the an instance counter, or automatedly move the vehicle to change lanes. Any suitable algorithms may be used in any of the units mentioned above without departing from the spirit or scope of the present disclosure.

Figure 2:
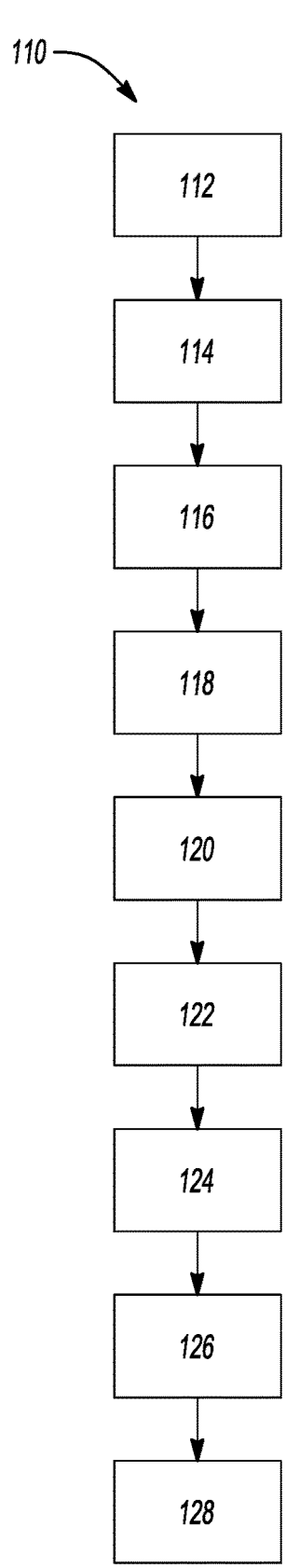
FIG. 2 is schematic view of a system for automatedly changing a lane of a vehicle with the method of FIG. 1.

In accordance with one example of the present disclosure, a method 110 of automatedly changing a first road lane in which a vehicle occupies to a second road lane based on environmental conditions to maintain engagement of an automated driving system of the vehicle is provided in FIG. 2. The method 110 described herein may be implemented by the system 10 of FIG. 1. As shown, the method 110 comprises providing in box 112 a road map database. As discussed above, the road map database may be stored in the road map module 18 discussed above and shown in FIG. 1. In this example, the road map database is a compilation of road maps within predetermined regions such as regions within a city, a county, a state, a country or globally.

As depicted in FIG. 2, The method 110 further comprises checking in box 114 a location of the vehicle based on the GPS of the vehicle and the road map database to define a map segment of the first and second road lanes. In one example, the step of checking 114 the location of the vehicle comprises comparing a first or locational data of the vehicle from the GPS with a second or map data of the map segment from the road map database. In this example, the ECU 14 may accomplish this step. That is, the ECU 14 is able to determine a three-dimensional location of the vehicle relative to the map segment. That is, locational data of the vehicle is received from the GPS by way of the receiver 16 (FIG. 1). Based on the locational data, the three-dimensional location of the vehicle may be calculated relative to time.

In this example, the first road lane is designated a host lane in which the vehicle occupies in the map segment. The second road lane is designated as an available lane in the map segment based on environmental conditions. That is, availability of a lane is based on environmental condition such as road conditions, lane lines, obstructions, and road maintenance. It is to be understood that environmental conditions may include road conditions, lane lines, obstructions, road maintenance and any other external conditions that could impede on the engagement of the automated driving system (ADS) 12 with the vehicle during operation. Moreover, inclusion of such other external conditions would not depart from the scope or spirit of the present disclosure.

In this example, the method 110 further comprises monitoring in box 116 availability of the first road lane of map segment. Moreover, the sensor 20 (FIG. 1) monitors availability of the first road lane of map segment. As discussed above, the sensor 20 is able to send an availability signal representing availability of the first road lane of the map segment to the ECU 14.

Referring the FIG. 2, the method 110 further comprises detecting in box 118 whether the first road lane of the map segment has poor availability or acceptable availability based on environmental conditions. In this example, the step of detecting 118 may be achieved by the ECU 14. Moreover, acceptable availability may be based on environmental conditions of the host lane that allow the ADS to maintain engagement with the vehicle during operation. Poor availability may be based on environmental conditions that would impede on the engagement of the automated driving system 12 with the vehicle during operation.

As shown in FIG. 2, the method 110 further comprises flagging in box 120 the first road lane of the map segment if the first road lane is detected to have poor availability. In this example, when the first road lane is detected to have poor availability, the ECU 14 sends a first signal to the back office unit 22 accordingly. That is, the first signal is a first data representing the first road lane has poor availability. As discussed above, the back office unit 22 flags the first road lane of the map segment when the back office unit 22 receives the first signal from the ECU 14. The step of flagging 120 may be accomplished when the first data is added to the backoffice database of the back office unit 22.

The method 110 further comprises logging in box 122 the first road lane of the map segment in an instance counter calibrated to a predetermined occurrence threshold. In this example, when the first road lane is flagged, the back office unit 22 logs the first road lane of the map segment in a instance counter of the back office unit 22. As in the system 10 discussed above, the instance counter is calibrated to a predetermined occurrence threshold, e.g., 3 times, 5 times, 10 time or any other suitable threshold.

Further in this example, the method 110 comprises designating the first road lane as non-preferred in box 124 if the predetermined occurrence threshold is reached. For example, the first road lane is designated as non-preferred when the predetermined occurrence threshold is calibrated to three times of an occurrence and the first road lane is logged on a third occurrence. In this example, the back office unit 22 may implement the step of designating 124 the first road lane as non-preferred. Furthermore, such information may be stored within the backoffice database and in the road map module 18.

As depicted in FIG. 2, the method 110 further comprises automatedly moving the vehicle to the second road lane in box 126 with the automated driving system (ADS) 12. In this example, the ALC unit 24 moves the vehicle to the second road lane with the ADS if the first road lane is designated as non-preferred, Furthermore, the method 110 comprises designating the second road lane as the host lane in box 128 after the vehicle is moved to the second road lane. The step of designating 128 may be accomplished by the ECU 14 as described above.

Figure 3:
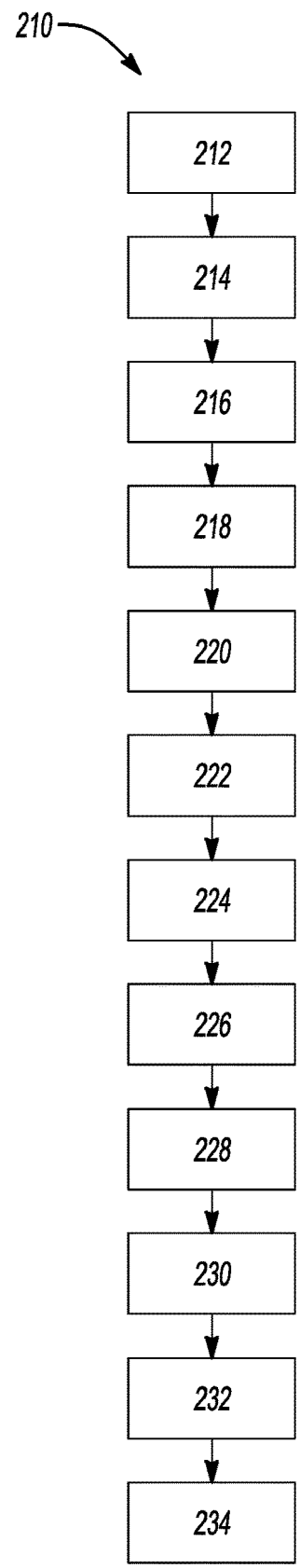
FIG. 3 is a flowchart of a method of automatedly changing a lane of a vehicle in accordance with another example of the present disclosure.

In accordance with another example of the present disclosure, a method 210 of automatedly changing a first road lane in which a vehicle occupies to a second road lane based on environmental conditions to maintain engagement of an automated driving system of the vehicle is provided in FIG. 3. The method 210 described herein may also be implemented by the system 10 of FIG. 1. As shown, the method 210 comprises providing in box 212 a road map database. As discussed above, the road map database may be stored in the road map module 18 discussed above and shown in FIG. 1. In this example, the road map database is a compilation of road maps within predetermined regions such as regions within a city, a county, a state, a country or globally.

As depicted in FIG. 3, The method 210 further comprises checking in box 214 a location of the vehicle based on the GPS of the vehicle and the road map database to define a map segment of the first and second road lanes. In one example, the step of checking 214 the location of the vehicle comprises comparing a first or locational data of the vehicle from the GPS with a second or map data of the map segment from the road map database. In this example, the ECU 14 may accomplish this step. That is, the ECU 14 is able to determine a three-dimensional location of the vehicle relative to the map segment. That is, locational data of the vehicle is received from the GPS by way of the receiver 16 (FIG. 1). Based on the locational data, the three-dimensional location of the vehicle may be calculated relative to time.

In this example, the first road lane is designated a host lane in which the vehicle occupies in the map segment. The second road lane is designated as an available lane in the map segment based on environmental conditions. That is, availability of a lane is based on environmental condition such as road conditions, lane lines, obstructions, and road maintenance. It is to be understood that environmental conditions may include road conditions, lane lines, obstructions, road maintenance and any other external conditions that could impede on the engagement of the automated driving system (ADS) 12 with the vehicle during operation. Moreover, inclusion of such other external conditions would not depart from the scope or spirit of the present disclosure.

In this example, the method 210 further comprises monitoring in box 216 availability of the first road lane of map segment. Moreover, the sensor 20 (FIG. 1) monitors availability of the first road lane of map segment. As discussed above, the sensor 20 is able to send an availability signal representing availability of the first road lane of the map segment to the ECU 14.

Referring the FIG. 3, the method 210 further comprises detecting in box 218 whether the first road lane of the map segment has poor availability or acceptable availability based on environmental conditions. In this example, the step of detecting 218 may be achieved by the ECU 14. Moreover, acceptable availability may be based on environmental conditions of the host lane that allow the ADS to maintain engagement with the vehicle during operation. Poor availability may be based on environmental conditions that would impede on the engagement of the automated driving system 12 with the vehicle during operation.

As shown in FIG. 3, the method 210 further comprises flagging in box 220 the first road lane of the map segment if the first road lane is detected to have poor availability. In this example, when the first road lane is detected to have poor availability, the ECU 14 sends a first signal to the back office unit 22 accordingly. That is, the first signal is a first data representing the first road lane has poor availability. As discussed above, the back office unit 22 flags the first road lane of the map segment when the back office unit 22 receives the first signal from the ECU 14. The step of flagging 220 may be accomplished when the first data is added to the backoffice database of the back office unit 22.

The method 210 further comprises logging in box 222 the first road lane of the map segment in an instance counter calibrated to a predetermined occurrence threshold. In this example, when the first road lane is flagged, the back office unit 22 logs the first road lane of the map segment in a instance counter of the back office unit 22. As in the system 10 discussed above, the instance counter is calibrated to a predetermined occurrence threshold, e.g., 3 times, 5 times, 10 time or any other suitable threshold.

Further in this example, the method 210 comprises designating the first road lane as non-preferred in box 224 if the predetermined occurrence threshold is reached. For example, the first road lane is designated as non-preferred when the predetermined occurrence threshold is calibrated to three times of an occurrence and the first road lane is logged on a third occurrence. In this example, the back office unit 22 may implement the step of designating 224 the first road lane as non-preferred. Furthermore, such information may be stored within the backoffice database and in the road map module 18.

As depicted in FIG. 3, the method 210 further comprises automatedly moving the vehicle to the second road lane in box 226 with the automated driving system (ADS) 12. In this example, the ALC unit 24 moves the vehicle to the second road lane with the ADS if the first road lane is designated as non-preferred, As shown in FIG. 3, the method 210 comprises designating the second road lane as the host lane in box 228 after the vehicle is moved to the second road lane. The step of designating 228 may be accomplished by the ECU 14 as described above.

Referring to FIG. 3, the further method 210 comprises maintaining in box 230 the vehicle in the first road lane of the map segment, if the first road lane is detected to have acceptable availability. In this example, the step of maintaining 230 the vehicle in the first road lane is implemented by the ECU 14 and the ADS unit 12. Accordingly, the ECU 14 is arranged to detect whether the first road lane has acceptable or poor availability. Moreover, the sensor 20 is arranged to send a second availability signal representing acceptable availability of the first road lane to the ECU 14. If the first road lane is detected to have acceptable availability, the ECU 14 may send a second signal to the ADS to maintain the vehicle in the first road lane. In this example, the second signal is a second data representing the first road lane has acceptable availability.

Moreover, the method 210 comprises maintaining in box 232 the first road lane as the host lane if the vehicle is maintained in the first road lane. Furthermore, the method 210 comprises maintaining in box 234 engagement of the automated driving system 12 with the vehicle if the first road lane is maintained as the host lane. In this example, the ADS unit 12 remains engaged with the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of automatedly changing a first road lane in which a vehicle occupies to a second road lane based on environmental conditions to maintain engagement of an automated driving system with a global positioning system (GPS) of the vehicle, the method comprising:
   providing a road map database;
   checking a location of the vehicle based on the GPS of the vehicle and the road map database to define a map segment of the first and second road lanes, the first road lane being designated a host lane in which the vehicle occupies in the map segment, the second road lane being designated as an available lane in the map segment based on environmental conditions;
   monitoring availability of the first road lane of map segment;
   detecting whether the first road lane of the map segment has poor availability based on environmental conditions;
   flagging the first road lane of the map segment, if the first road lane is detected to have poor availability;
   logging the first road lane of the map segment in an instance counter calibrated to a predetermined occurrence threshold;
   designating the first road lane as non-preferred if the predetermined occurrence threshold is reached;
   moving the vehicle to the second road lane with the automated driving system; and
   designating the second road lane as the host lane.

2. The method of claim 1 further comprising:
   maintaining the vehicle in the first road lane of the map segment, if the first road lane is detected to have acceptable availability;
   maintaining the first road lane as the host lane if the vehicle is maintained in the first road lane; and
   maintaining engagement of the automated driving system with the vehicle if the first road lane is maintained as the host lane.

3. The method of claim 1 wherein environmental conditions include road conditions, lane lines, obstructions, and road maintenance.

4. The method of claim 3 wherein acceptable availability is based on environmental conditions that allow the automated driving system to maintain engagement with the vehicle during operation.

5. The method of claim 3 wherein poor availability is based on environmental conditions that would impede on the engagement of the automated driving system with the vehicle during operation.

6. The method of claim 1 wherein the step of checking the location of the vehicle comprises:
comparing a first data of the vehicle from the GPS with a second data of the map segment from the road map database; and
determining the location of the vehicle relative to the map segment.

7. The method of claim 6 wherein the first data of the vehicle from GPS provides transmitted information to calculate a three-dimensional location of the vehicle relative to time and wherein the second data of the map segment from the road map database provides environmental information relative to lane lines and condition of the first and second road lanes.

8. A system for automatedly changing a first road lane in which a vehicle occupies to a second road lane based on environmental conditions to maintain engagement of an automated driving system with a global positioning system (GPS) of the vehicle, the system comprising:
an electronic control unit (ECU) dispose in the vehicle and in communication with the automated driving system, the ECU arranged to check a location of the vehicle based on a GPS data of the vehicle and a road map database, defining a map segment of the first and second road lanes, the first road lane being designated a host lane in which the vehicle occupies in the map segment, the second road lane being designated as an available lane in the map segment based on environmental conditions, the ECU arranged to receive an availability signal representing availability of the first road lane of the map segment and to detect whether the first road lane of the map segment has poor availability based on environmental conditions;
at least one sensor disposed about the vehicle and arranged to monitor availability of the first road lane of map segment, the at least one sensor being in communication with the ECU to send the availability signal representing availability of the first road lane of the map segment;
a back office unit disposed remotely from the vehicle and in communication with the ECU, the back office unit arranged to flag the first road lane of the map segment if the first road lane is detected to have poor availability, the back office unit arranged to log the first road lane of the map segment in an instance counter of the back office unit, the instance counter being calibrated to a predetermined occurrence threshold, the back office unit arranged to designate the first road lane as non-preferred if the predetermined occurrence threshold is reached; and
an automated lane change (ALC) unit disposed in the vehicle and in communication with the ECU, the ALC unit arranged to move the vehicle to the second road lane with the automated driving system.

9. The system of claim 8 further comprising:
a road map module disposed in the vehicle and in communication with the ECU, the road map module arranged to store the road map database, the road map database being a compilation of road maps within predetermined regions; and
a receiver disposed in the vehicle and in communication with the ECU, the receiver arranged to receive locational data of the vehicle from the GPS.

10. The system of claim 9 wherein the ECU is arranged to check a location of the vehicle by comparing a first data of the vehicle from the GPS with a second data of the map segment from the road map database and by determining the location of the vehicle relative to the map segment.

11. The system of claim 10 wherein the locational data of the vehicle from GPS provides transmitted information to calculate a three-dimensional location of the vehicle relative to time and wherein the second data of the map segment from the road map database provides environmental information relative to lane lines and condition of the first and second road lanes.

12. The system of claim 8 wherein the ECU is arranged to designate the second road lane as the host lane after the vehicle is moved to the second road lane.

13. The system of claim 8 wherein the ECU is arranged to maintain the vehicle in the first road lane of the map segment if the first road lane is detected to have acceptable availability, the ECU being arranged to maintaining the first road lane as the host lane if the vehicle is maintained in the first road lane, the ECU being arranged to maintain engagement of the automated driving system with the vehicle if the first road lane is maintained as the host lane.

14. The system of claim 8 wherein environmental conditions include road conditions, lane lines, obstructions, and road maintenance.

15. The system of claim 14 wherein acceptable availability is based on environmental conditions that allow the automated driving system to maintain engagement with the vehicle during operation.

16. The system of claim 14 wherein poor availability is based on environmental conditions that would impede on the engagement of the automated driving system with the vehicle during operation.

17. A method of automatedly changing a first road lane in which a vehicle occupies to a second road lane based on environmental conditions to maintain engagement of an automated driving system with a global positioning system (GPS) of the vehicle, the method comprising:
providing a road map database;
checking a location of the vehicle based on the GPS of the vehicle and the road map database to define a map segment of the first and second road lanes, the first road lane being designated a host lane in which the vehicle occupies in the map segment, the second road lane being designated as an available lane in the map segment based on environmental conditions;
monitoring availability of the first road lane of map segment;
detecting whether the first road lane of the map segment has poor availability based on environmental conditions;
flagging the first road lane of the map segment, if the first road lane is detected to have poor availability;
logging the first road lane of the map segment in an instance counter calibrated to a predetermined occurrence threshold;
designating the first road lane as non-preferred if the predetermined occurrence threshold is reached;
moving the vehicle to the second road lane with the automated driving system;
designating the second road lane as the host lane;
maintaining the vehicle in the first road lane of the map segment, if the first road lane is detected to have acceptable availability;
maintaining the first road lane as the host lane if the vehicle is maintained in the first road lane; and
maintaining engagement of the automated driving system with the vehicle if the first road lane is maintained as the host lane.

18. The method of claim 17 wherein environmental conditions include road conditions, lane lines, obstructions, and road maintenance.

19. The method of claim 18 wherein acceptable availability is based on environmental conditions that allow the automated driving system to maintain engagement with the vehicle during operation.

20. The method of claim 18 wherein poor availability is based on environmental conditions that would impede on the engagement of the automated driving system with the vehicle during operation.

* * * * *